(12) United States Patent
Jung et al.

(10) Patent No.: US 8,872,434 B2
(45) Date of Patent: Oct. 28, 2014

(54) CONSTANT-CURRENT-DRIVE LED MODULE DEVICE

(75) Inventors: Hye Man Jung, Gyeonggi-do (KR); Seok Jin Ha, Gyeongsangnam-do (KR); In Ki Park, Gyeonggi-do (KR); Sang Shin Koo, Gyeonggi-do (KR); Jong Hyun Kim, Gyeongsangnam-do (KR)

(73) Assignee: Airtec System Co., Ltd., Gyeonggi-do (KR)

( * ) Notice: Subject to any disclaimer, the term of this patent is extended or adjusted under 35 U.S.C. 154(b) by 193 days.

(21) Appl. No.: 13/502,579

(22) PCT Filed: Nov. 6, 2009

(86) PCT No.: PCT/KR2009/006505
§ 371 (c)(1),
(2), (4) Date: Apr. 18, 2012

(87) PCT Pub. No.: WO2011/052834
PCT Pub. Date: May 5, 2011

(65) Prior Publication Data
US 2012/0206056 A1    Aug. 16, 2012

(30) Foreign Application Priority Data

Oct. 26, 2009  (KR) .................. 10-2009-0101722
Oct. 26, 2009  (KR) .................. 10-2009-0101742

(51) Int. Cl.
*H05B 33/08*  (2006.01)
(52) U.S. Cl.
CPC ................... *H05B 33/0818* (2013.01)
USPC ......... 315/200 R; 315/209 R; 363/89; 363/80
(58) Field of Classification Search
USPC .................................................... 315/200 R
See application file for complete search history.

(56) References Cited

U.S. PATENT DOCUMENTS

| 4,298,869 | A | | 11/1981 | Okuno |
| 4,475,139 | A | * | 10/1984 | Chadwick .................... 361/91.7 |
| 4,490,769 | A | * | 12/1984 | Boenig ........................... 361/58 |
| 7,388,560 | B2 | | 6/2008 | Yamamoto et al. |
| 7,518,525 | B2 | * | 4/2009 | Chou ...................... 340/815.45 |
| 2002/0158590 | A1 | | 10/2002 | Saito et al. |
| 2004/0251854 | A1 | * | 12/2004 | Matsuda et al. .............. 315/291 |

(Continued)

FOREIGN PATENT DOCUMENTS

| EP | 2 068 223 A2 | 6/2009 |
| JP | 08-194448 A | 7/1996 |

(Continued)

OTHER PUBLICATIONS

Full wave bridge rectifier, Aug. 27, 2009, Circuits Today, http://www.circuitstoday.com/full-wave-bridge-rectifier.*
LM431 Adjustable Precision Zener Shunt Regulator, 2000, National Semiconductor, p. 3.*
Kit Sum K, "Improved Valley-Fill Passive Power Factor Correction Current Shaper Approaches IEC Specification Limits", Manuscript Swissball Exercises, PCIM, Feb. 1998, pp. 42, 44, 47-51, vol. 24, No. 2.

*Primary Examiner* — Alexander H Taningco
*Assistant Examiner* — Tanina Bradley
(74) *Attorney, Agent, or Firm* — Rabin & Berdo, P.C.

(57) ABSTRACT

A constant-current-drive LED module device includes a rectifier configured to receive and rectify an alternating current power source; a unidirectional LED module unit configured to connect to one end of the rectifier; and a constant current unit configured to connect between the unidirectional LED module unit and the other end of the rectifier to control constant current.

6 Claims, 13 Drawing Sheets

(56) References Cited

U.S. PATENT DOCUMENTS

| | | | |
|---|---|---|---|
| 2005/0057468 A1 | 3/2005 | Yamamoto et al. | |
| 2006/0012349 A1* | 1/2006 | Allen | 323/265 |
| 2006/0108991 A1* | 5/2006 | Jiang et al. | 323/274 |
| 2007/0024254 A1 | 2/2007 | Radecker | |
| 2007/0170874 A1* | 7/2007 | Kunimatsu et al. | 315/291 |
| 2008/0203932 A1* | 8/2008 | Ball | 315/189 |
| 2008/0211421 A1* | 9/2008 | Lee et al. | 315/250 |
| 2008/0316781 A1* | 12/2008 | Liu | 363/80 |
| 2009/0160370 A1* | 6/2009 | Tai et al. | 315/312 |
| 2009/0212721 A1 | 8/2009 | Maruyama | |
| 2009/0213629 A1* | 8/2009 | Liu et al. | 363/89 |
| 2009/0251934 A1 | 10/2009 | Shteynberg et al. | |
| 2010/0164404 A1* | 7/2010 | Shao et al. | 315/297 |
| 2010/0308733 A1* | 12/2010 | Shao | 315/119 |

FOREIGN PATENT DOCUMENTS

| | | |
|---|---|---|
| JP | 2000-260578 A | 9/2000 |
| JP | 2001-215913 A | 8/2001 |
| JP | 2013-504175 A | 2/2013 |
| KR | 10-1999-0084247 A | 12/1999 |
| KR | 10-2005-0021917 A | 3/2005 |
| KR | 10-2005-0045748 A | 5/2005 |
| WO | WO 2009/089529 A1 | 7/2009 |

\* cited by examiner

CONSTANT-CURRENT-DRIVE LED MODULE DEVICE

BACKGROUND OF THE INVENTION

Exemplary embodiments of the present invention relate to a constant-current-drive LED module device, and more particularly, to an LED module device driven with constant current.

A luminescent diode (LED) may be operated only when constant current is stably supplied to a current drive element. In particular, as the LED demanding high power requires large drive current (generally, 350 mA or more), the LED generates a significant amount of heat and as a result, has degradation in luminance larger than the LED driven with low power.

This is directly connected with a lifespan of the LED and acts as very important factors in a lighting market. Therefore, all the LEDs driven with high power are driven with constant current and are driven by a pulse width modulation (PWM) scheme so as to more efficiently use power of a switching mode power supply (SMPS) that is used as a constant-current power source.

However, the PWM scheme requires electronic components, which leads to an increase in manufacturing costs. Therefore, a scheme for rectifying an alternating-current power source and applying it to the serially connected LED modules has been used in recent.

FIG. 1 illustrates a unidirectional LED module device in accordance with the related art.

The unidirectional LED module device in accordance with the related art includes a bridge diode 120 rectifying an input alternating-current power source 110 and a unidirectional LED module 130 connected to the bridge diode 120 through a resistor R1.

In this configuration, the resistor R1 determines a magnitude in current flowing in the unidirectional LED module 130.

FIG. 2 illustrates a waveform diagram of input voltage and driving current at the unidirectional LED module in accordance with the related art, wherein i is a current waveform flowing in a front end of the bridge diode 120 according to input AC voltage.

When a magnitude in voltage is a forward threshold voltage or more of the LED module 130 at a positive half-period voltage of the AC power source 110, current flows, such that the LED module 130 is light-emitted. Similarly, when the magnitude in voltage is the forward threshold voltage or more of the LED module 130 even at a negative half-period of the AC power source 110, current flows, such that the LED module 130 is light-emitted.

That is, as illustrated in FIG. 2, load current does not flow in period a and period b.

FIG. 3 illustrates a unidirectional LED module device in accordance with the related art.

The bidirectional LED module in accordance with the related art includes and a bidirectional LED module 220 that is connected to an input alternating-current power source 210 through the resistor R1.

In this configuration, the resistor R1 determines a magnitude in current flowing in the positive LED module 220.

FIG. 4 illustrates a waveform diagram of input voltage and driving current at the bidirectional LED module in accordance with the related art, wherein V is an voltage waveform and i is a current waveform flowing in the resistor R1 according to input alternating voltage, which is the same as FIG. 2.

As described above, a power factor may be low, total harmonic distortion (THD) may be increased, and a flicker phenomenon may excessively occur, due to operating characteristics of the LED module operated only when the magnitude in the input voltage is the forward threshold voltage or more, that is, the operating characteristics of the LED module by suddenly flowing current due to the conduction of the LED module when the magnitude in the input voltage is the forward threshold voltage or more of the LED module forward connected by the input of the AC power source, the short operating period of the LED module within one period of the AC power source, and the like. As a result, light efficiency may be degraded.

SUMMARY OF THE INVENTION

An embodiment of the present invention is directed to a constant-current-drive LED module device capable of suppressing a flicker phenomenon due to AC LED operating characteristics according to the input of an alternating-current power source.

Further, another embodiment of the present invention is directed to a constant-current-drive LED module device capable of preventing degradation in light efficiency due to AC LED operation characteristics according to the input of an AC power source.

Still another embodiment of the present invention is directed to a constant-current-drive LED module device capable of preventing degradation in a power factor due to AC LED operation characteristics according to the input of an AC power source.

In accordance with an embodiment of the present invention, a constant-current-drive LED module device includes: a rectifier configured to receive and rectify an alternating current power source; a unidirectional LED module unit configured to connect to one end of the rectifier; and a constant current unit configured to connect between the unidirectional LED module unit and the other end of the rectifier to control constant current.

The constant current may include: a switching unit configured to connect between the LED module unit and the other end of the rectifier and to be switched using pulsating current output from the rectifier; a control voltage output unit configured to detect load current flowing in the unidirectional LED module unit and convert switching voltage output from the switching unit into driving voltage of first or second level according to a magnitude in the detected load current; and a constant current driver configured to be controlled by the driving voltage of the first or second level to provide constant current.

The constant-current-drive unit may include: a control voltage output unit configured to detect the load current flowing in the unidirectional LED module unit and convert the voltage between the LED module unit and the other end of the rectifier into the driving voltage of the first and second levels according to the magnitude in the detected load current; and a constant current driver configured to be controlled by the driving voltage of the first and second levels to provide the constant current.

The constant-current-drive LED module device may further include: a charging and discharging unit including a resistor-capacitor connected to an upper diode and/or a lower diode of the rectifier in parallel.

The constant current driver may be any one of a field effect transistor (FET), a bipolar junction transistor (BJT), and an insulated gate bipolar transistor (IGBT).

In accordance with another embodiment of the present invention, a constant-current-drive LED module device includes: a rectifier configured to receive and rectify an alternating current power source; a constant current unit configured to connect to a lead leg and a lag leg of the rectifying unit to provide constant current; and a bidirectional LED module unit connected between the other end of the rectifier and the other end of the alternating current power source.

The constant current unit may include: a switching unit configured to be connected between the lead leg and the lag leg of the rectifying unit and to be switched using pulsating current output from the rectifier; a control voltage output unit configured to detect load current flowing in the unidirectional LED module unit and convert switching voltage output from the switching unit according to a magnitude in the detected load current into driving voltage of first or second level; and a constant current driver configured to be controlled by the driving voltage of the first or second level to provide constant current.

The constant-current-drive unit may include: a control voltage output unit configured to detect the load current flowing in the bidirectional LED module unit and convert the voltage between the lead leg and the lag leg of the rectifier into the driving voltage of the first and second levels according to the magnitude in the detected load current; and a constant current driver configured to be controlled by the driving voltage of the first and second levels to provide the constant current.

The constant-current-drive LED module device may further include: a charging and discharging unit including a resistor-capacitor connected to the bidirectional LED module unit in parallel.

The constant current driver may be any one of a field effect transistor (FET), a bipolar junction transistor (BJT), and an insulated gate bipolar transistor (IGBT).

The control voltage output unit may include: a detection resistor configured to detect load current flowing in the unidirectional LED module unit; and a three terminal zener diode configured to output zener voltage that is the driving voltage of the first level when control voltage applied to the detection resistor is a predetermined value or less and output the driving voltage of the second level maintaining a short state between an anode and a cathode when the control voltage exceeds the predetermined value.

The control voltage output unit may include: a detection resistor configured to detect load current flowing in the bidirectional LED module unit; and a three terminal zener diode configured to output zener voltage that is the driving voltage of the first level when control voltage applied to the detection resistor is a predetermined value or less and output the driving voltage of the second level maintaining a short state between an anode and a cathode when the control voltage exceeds the predetermined value.

When the input voltage of the AC power source is fluctuated within a range of 10% of rated voltage, the load current flowing in the unidirectional LED module unit may be fluctuated within a range of 5 to 20%.

When the input voltage of the AC power source is fluctuated within a range of 10%, luminous quantity of the unidirectional LED module unit may be fluctuated within a range of 5 to 20%.

DESCRIPTION OF SPECIFIC EMBODIMENTS

Figure 5:
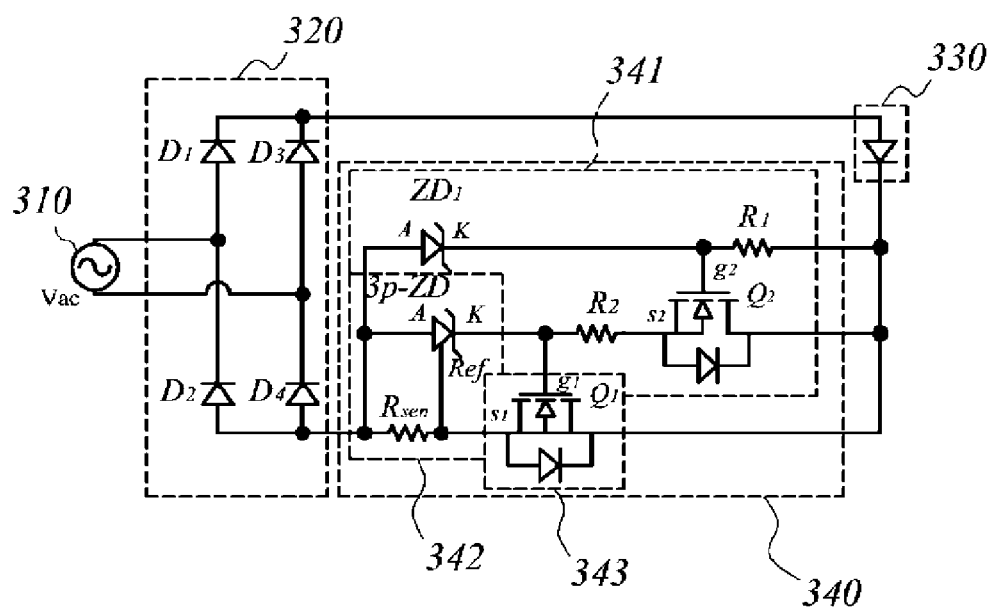
FIG. 5 is a circuit diagram of a constant-current-drive unidirectional LED module device in accordance with a first embodiment of the present invention.

FIG. 5 is a circuit diagram of a constant-current-drive unidirectional LED module device in accordance with a first embodiment of the present invention.

A constant-current-drive unidirectional LED module device in accordance with an embodiment of the present invention is configured to include a rectifier 320 receiving and rectifying a commercial alternating-current power source 310; a unidirectional LED module unit 330 connected to one end of the rectifier 320; a constant current unit 340 connected to the other end of the LED module unit 330 and the rectifier 320 to provide constant current.

The constant current unit 340 in accordance with the embodiment of the present invention includes a switching unit 341 connected between the LED module unit 330 and the other end of the rectifier 320 and being switched using pulsating current output from the rectifier 320, a control voltage output unit 342 detecting load current flowing in the unidirectional LED module unit 330 and converting switching voltage output from the switching unit 341 according to a magnitude in the detected load current into driving voltage of first and second levels, and a constant current driver 343 controlled by the driving voltage of the first and second levels to provide constant current.

The switching unit 341 includes the first resistor R1 and a first zener diode ZD1 connected between the LED module unit 330 and the other end of the rectifier 320 in series, a second FET Q2 turned-on/off according to zener voltage of the first zener diode ZD1, and a second resistor R2 having one end connected to a source terminal of the second FET Q2.

The control voltage output unit 342 includes a detection resistor Rsen connected between a source terminal of the first FET Q1 and the other end of the rectifier 320 and a three terminal zener diode 3ZD connected between the other end of the second resistor R2 and the other end of the rectifier 320 and controlled by control voltage Vcon input to detection resistance to output the first and second driving voltage.

The constant-current-drive unit 343 includes the first FET Q1 that is connected to the unidirectional LED module unit 330 and the detection resistor Rsen to have different operating regions according to the driving voltage of the first and second levels.

An operation of the constant-current-drive unidirectional LED module device in accordance with the embodiment of the present invention will be described below.

When the voltage input between the LED module unit 330 and the other end of the rectifier 320 exceeds a predetermined level, both ends of the zener diode ZD1 maintain zener voltage and the second FET Q2 is turned-on by the zener voltage.

The three terminal zener diode 3p-ZD has the same characteristics as the general zener diode characteristics to output the zener voltage when the control voltage Vcon input to the detection resistance is a predetermined value or less and maintains a short state between an anode and a cathode when the control voltage Vcon exceeds a predetermined value.

The first FET Q1 is operated in a saturation region according to first driving voltage, that is, the zener voltage input from the three terminal zener diode 3p-ZD when the control voltage is a predetermined value or less. Meanwhile, when the control voltage exceeds a predetermined value, the three terminal zener diode 3p-ZD is operated at a short state and therefore, the control voltage input to the detection resistance Rsen is input to a gate-source terminal of the first FET Q1 in a reverse voltage state, such that the first FET Q1 is operated in an active region and thus, the load current has the constant current characteristics.

Figure 6:
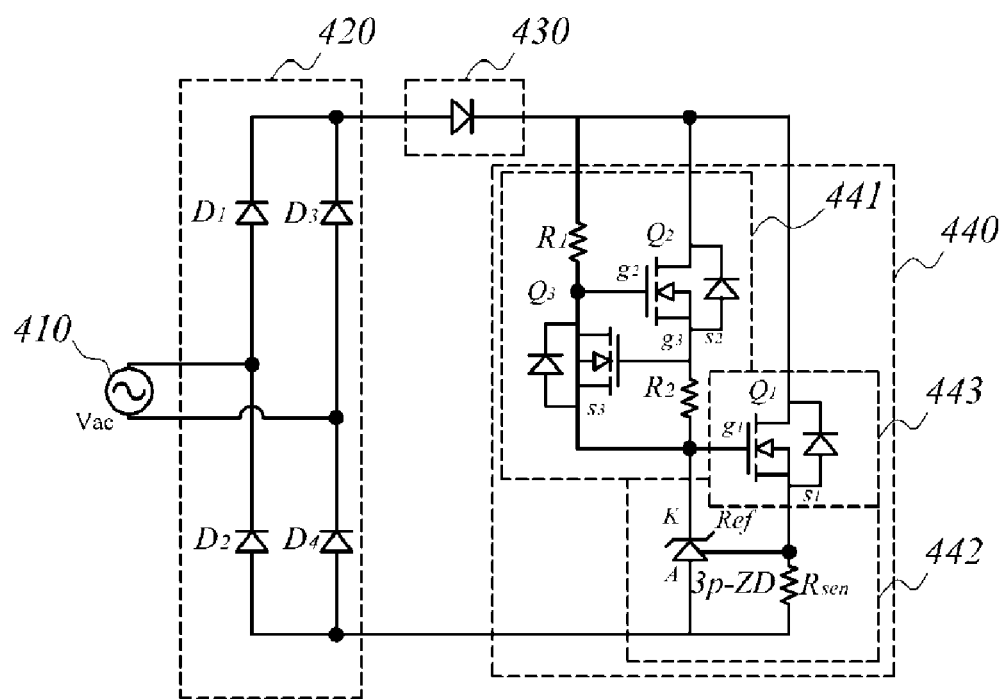
FIG. 6 is a circuit diagram of a constant-current-drive unidirectional LED module device in accordance with a second embodiment of the present invention.

FIG. 6 is a circuit diagram of the constant-current-drive unidirectional LED module device in accordance with a second embodiment of the present invention, which has the same components as the first embodiment of FIG. 5.

However, an operation of a constant-current unit 440 of the first embodiment of the present invention and the second embodiment of the present invention is the same as each other except that the second embodiment of the present invention configures a switching unit 441 using two FETs to provide the constant current, instead of the switching unit 341 in the first embodiment of FIG. 5.

Figure 7:
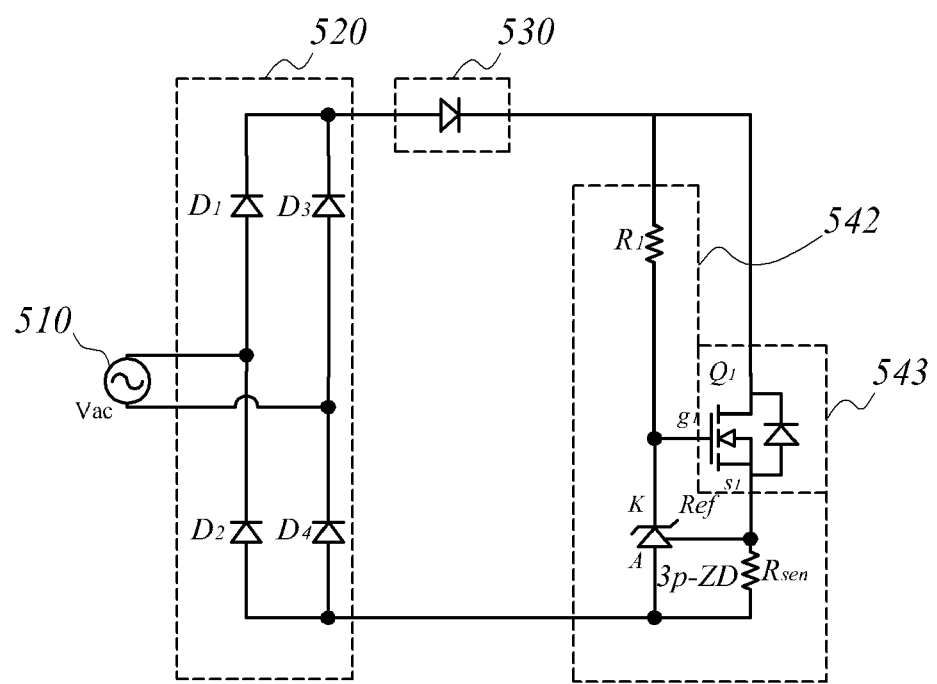
FIG. 7 is a circuit diagram of a constant-current-drive unidirectional LED module device in accordance with a third embodiment of the present invention.

FIG. 7 is a circuit diagram of a constant-current-drive unidirectional LED module device in accordance with a third embodiment of the present invention, which has the substantially same components as the first embodiment of FIG. 5.

However, an operation of the constant current unit 540 of the first embodiment of the present invention and the second embodiment of the present invention is the same as each other except that the second embodiment of the present invention does not use the switching unit 441 in accordance with the first embodiment of FIG. 5.

Figure 8:
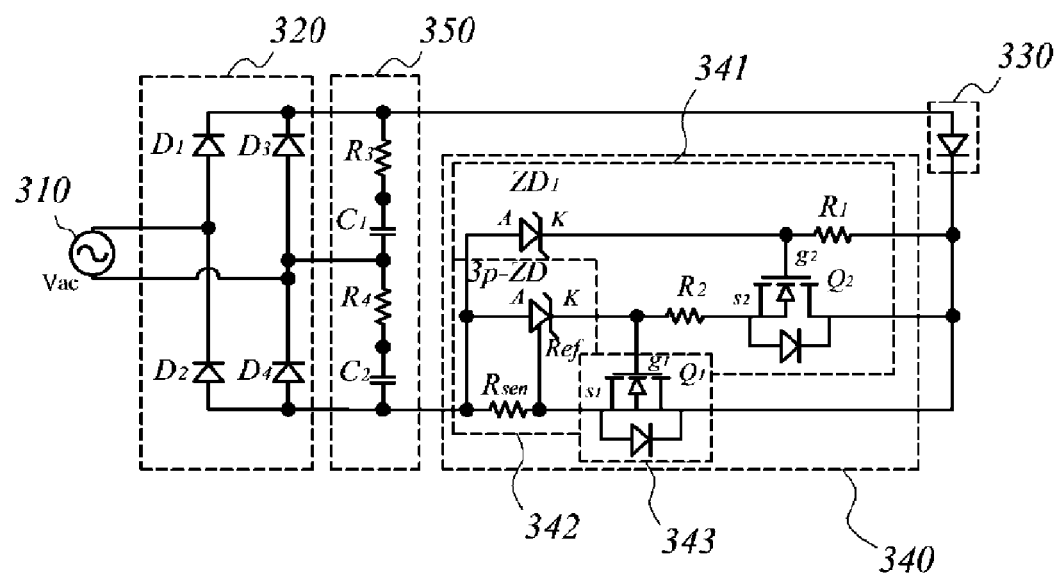
FIG. 8 is a circuit diagram of a constant-current-drive unidirectional LED module device in accordance with a fourth embodiment of the present invention.

FIG. 8 is a circuit diagram of the constant-current-drive unidirectional LED module device in accordance with a fourth embodiment of the present invention, which further includes a charging and discharging unit 350 in addition to the circuit of the first embodiment of FIG. 5.

The charging and discharging unit 350 includes a resistor R3-capacitor C1 and a resistor R4-capacitor C2 that are each connected with an upper diode D3 and a lower diode D4 of the rectifier 320 in parallel. The capacitor C1 and the capacitor C2 complementarily charge energy of the AC power source and discharges energy to the LED module unit. That is, the resistor R3-capacitor C1 store the AC voltage for the positive half-period of the AC power source and discharge the energy stored for the negative half-period.

The resistor R4-capacitor C2 store the AC voltage for the negative half-period of the AC power source and discharges the energy stored for the positive half-period.

Meanwhile, the charging and discharging unit 350 in accordance with the embodiment of the present invention can be similarly input even in the second embodiment of FIG. 6 or the third embodiment of FIG. 7.

Figure 9:
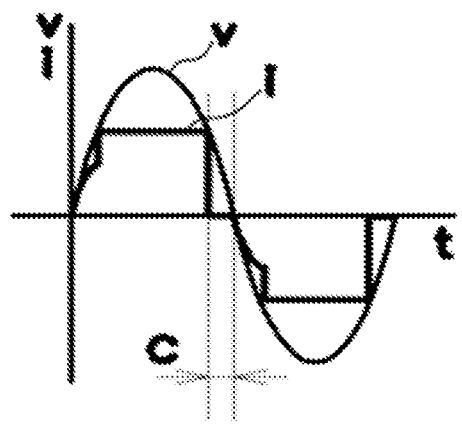
FIG. 9 is a voltage and current waveform diagram of a constant-current-drive unidirectional LED module device in accordance with a fourth embodiment of the present invention.

FIG. 9 is a voltage and current waveform diagram of a constant-current-drive unidirectional LED module device in accordance with a fourth embodiment of the present invention. In accordance with the embodiment of the present invention, the constant-current-drive unidirectional LED module device has the LED operating period having wider than that of the circuit in accordance with the related art of FIG. 1 to increase the active power, thereby improving the power factor (PF) and has the larger root mean square value of the fundamental wave than that of the circuit in accordance with the related art of FIG. 1, thereby improving the total harmonic distortion (THD).

Figure 10:
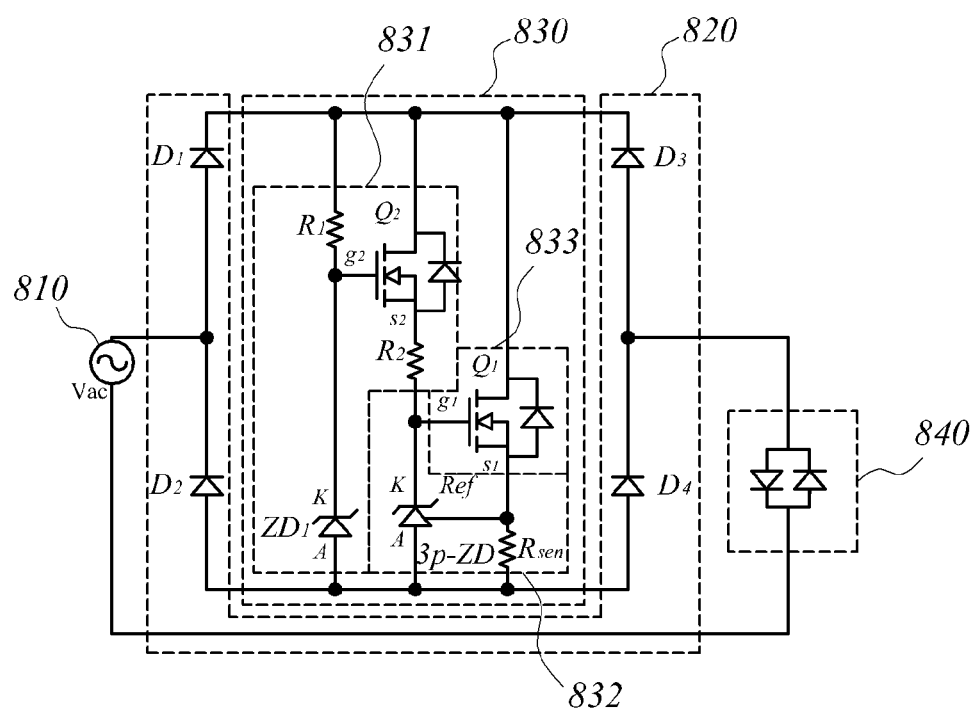
FIG. 10 is a circuit diagram of a constant-current-drive bidirectional LED module device in accordance with a fifth embodiment of the present invention.

FIG. 10 is a circuit diagram of a constant-current-drive bidirectional LED module device in accordance with a fifth embodiment of the present invention.

The constant-current-drive bidirectional LED module device in accordance with the embodiment of the present invention includes a rectifier 820 receiving and rectifying a commercial AC power source 810; a constant current unit 830 connected between lead legs D1 and D2 and lag legs D3 and D4 of the rectifying unit 820 to provide the constant current, and a bidirectional LED module unit 840 connected between the other end of the rectifying unit 820 and the other end 810 of the commercial AC power source 810.

The constant current unit 830 in accordance with the embodiment of the present invention includes a switching unit 831 connected between the lead legs D1 and D2 of the rectifying unit 820 and the lag legs D3 and D4 of the rectifying unit 820 and is switched by using the pulsating current output from the rectifier 820, a control voltage output unit 832 detecting the load current flowing the bidirectional LED module unit 840 and converting the switching voltage output from the switching unit 831 according to the magnitude in the detected load current into the driving voltage of the first and second levels, and a constant current driver 833 controlled by the driving voltage of the first and second levels to provide the constant current.

The switching unit 831 includes the first resistor R1 and the first zener diode ZD1 connected between the lead legs D1 and D2 and the lag legs D3 and D4 of the rectifier 320 in series, the second FET Q2 turned-off according to the zener voltage of the first zener diode ZD1, and the second resistor R2 having one end connected to a source terminal of the second FET Q2.

The control voltage output unit 832 includes the detection resistor Rsen disposed in a path of the load current and the three terminal zener diode 3p-ZD that is connected between the other end of the second resistor R2 and the bottom end of the rectifier 820 and is controlled by the control voltage Vcon input to the detection resistance to output the driving voltage of the first and second levels.

The constant current driver 833 includes the first FET Q1 that is connected between the top end of the rectifier 820 and the detection resistance Rsen to have different operating regions according to the driving voltage of the first and second levels.

The operation of the constant-current-drive unidirectional LED module device in accordance with the embodiment of the present invention will be described below.

When the voltage input between the top end and the bottom end of the rectifier 820 and the other end of the rectifier 320 exceeds a predetermined level, both ends of the zener diode ZD1 maintain zener voltage and the second FET Q2 is turned-on by the zener voltage.

The three terminal zener diode 3p-ZD has the same characteristics as the general zener diode characteristics to output the zener voltage when the control voltage Vcon input to the detection resistance is a predetermined value or less and maintains a short state between an anode and a cathode when the control voltage Vcon exceeds a predetermined value.

The first FET Q1 is operated in a saturation region according to first driving voltage, that is, the zener voltage input from the three terminal zener diode 3p-ZD when the control voltage is a predetermined value or less. Meanwhile, when the control voltage exceeds a predetermined value, the three terminal zener diode 3p-ZD is operated at a short state and therefore, the control voltage input to the detection resistance Rsen is input to a gate-source terminal of the first FET Q1 in a reverse voltage state, such that the first FET Q1 is operated in an active region and thus, the load current has the constant current characteristics.

Figure 11:
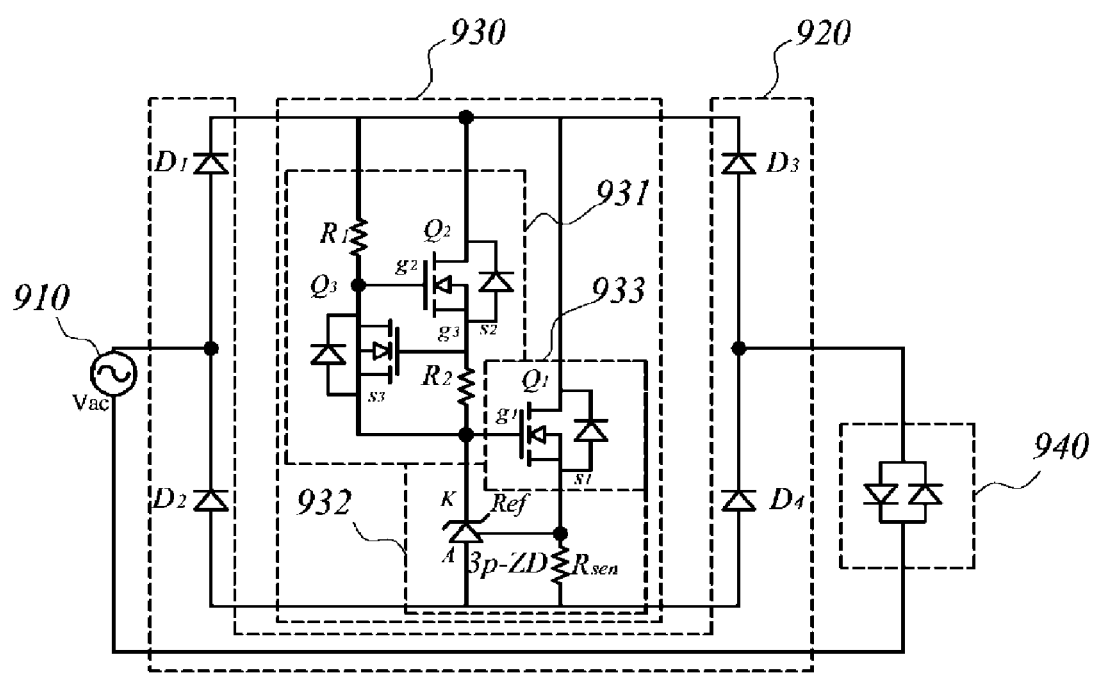
FIG. 11 is a circuit diagram of a constant-current-drive bidirectional LED module device in accordance with a sixth embodiment of the present invention.

FIG. 11 is a circuit diagram of a constant-current-drive bidirectional LED module device in accordance with a sixth embodiment of the present invention, which has the substantially same components as the fifth embodiment of FIG. 10.

However, an operation of a constant-current unit 930 of the sixth embodiment of the present invention and the fifth embodiment of the present invention is the same as each other except that the second embodiment of the present invention configures a switching unit 931 using two FETs to provide the constant current, instead of the switching unit 831 in the fifth embodiment of FIG. 10.

Figure 12:
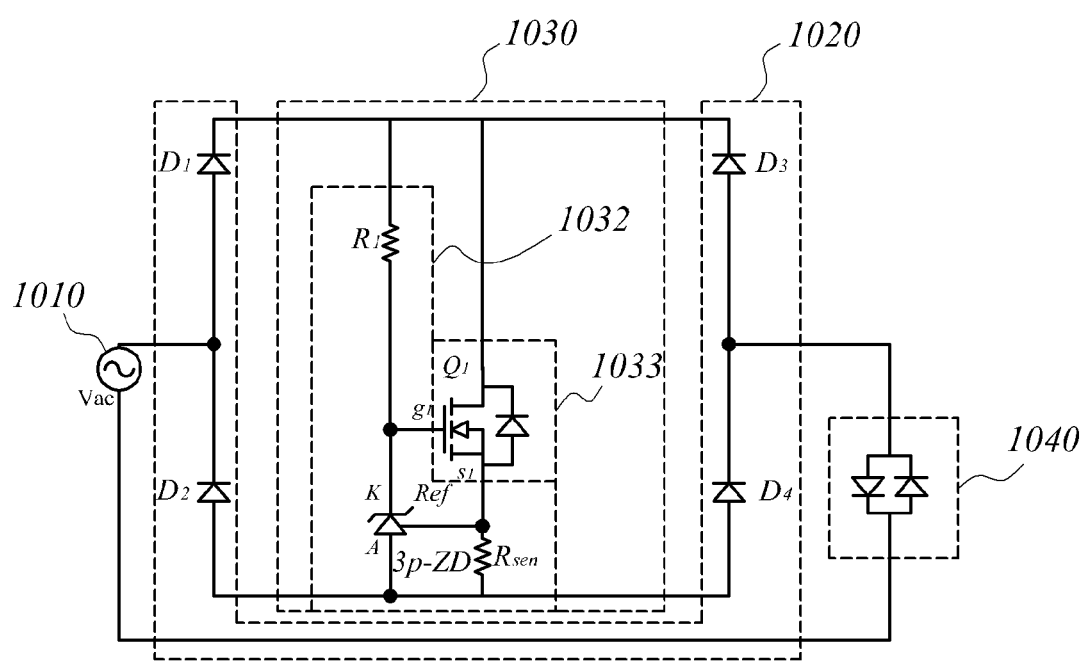
FIG. 12 is a circuit diagram of a constant-current-drive bidirectional LED module device in accordance with a seventh embodiment of the present invention.

FIG. 12 is a circuit diagram of a constant-current-drive bidirectional LED module device according to a seventh embodiment of the present invention, which has the substantially same components as the fifth embodiment of FIG. 10.

However, an operation of the constant current unit 1030 of the seventh embodiment of the present invention and the fifth embodiment of the present invention is the same as each other except that the seventh embodiment of the present invention does not use the switching unit 831 in accordance with the fifth embodiment of FIG. 10.

Figure 13:
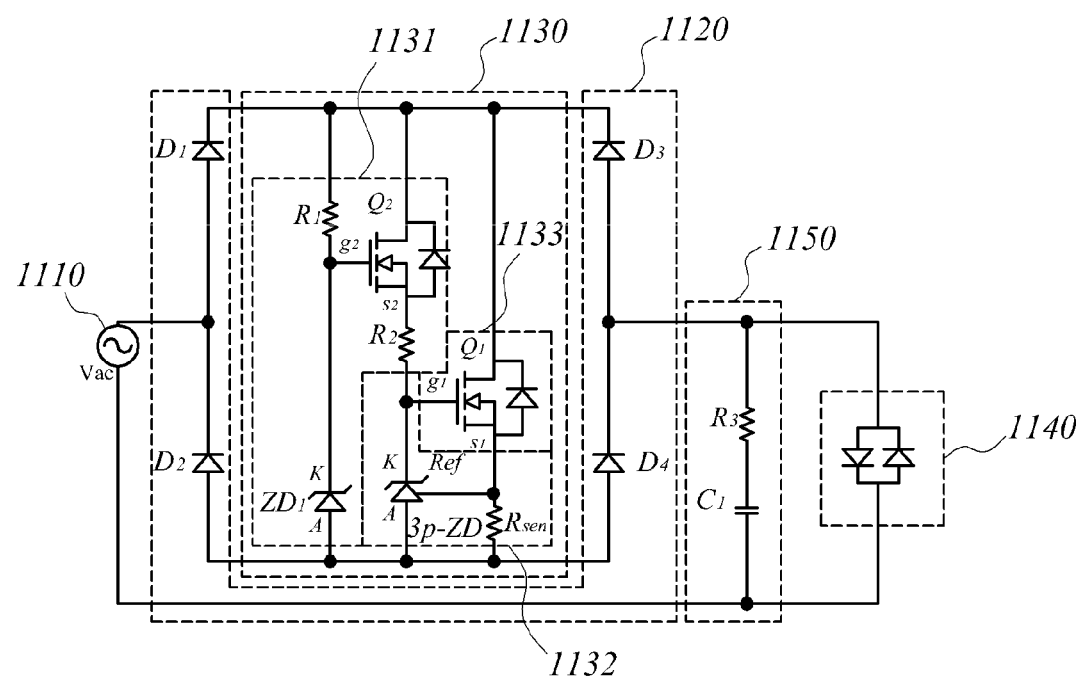
FIG. 13 is a circuit diagram of a constant-current-drive bidirectional LED module device in accordance with an eighth embodiment of the present invention.

FIG. 13 is a circuit diagram of the constant-current-drive bidirectional LED module device in accordance with an eighth embodiment of the present invention, which further includes a charging and discharging unit 1150 in addition to the circuit of the fifth embodiment of FIG. 10.

The charging and discharging 1150 includes the resistor R3-capacitor C1 connected with the bidirectional LED module unit 1140 in parallel. The capacitor C1 charges the energy of the AC power source and discharges energy to the bidirectional LED module unit 1140.

Meanwhile, the charging and discharging unit 1150 in accordance with the embodiment of the present invention can be similarly input even in the sixth embodiment of FIG. 11 or the seventh embodiment of FIG. 12.

Figure 3:
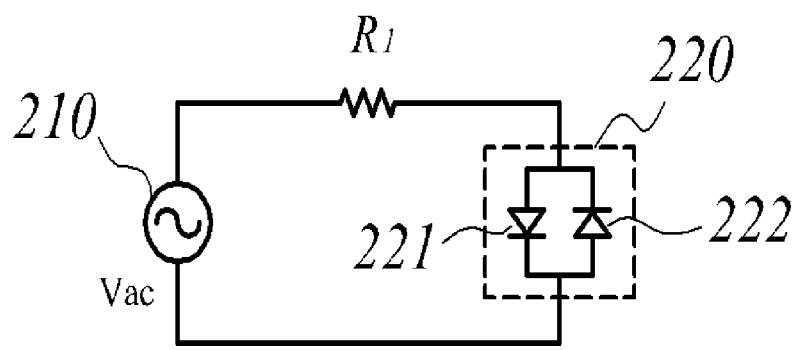
FIG. 3 illustrates a bidirectional LED module device in accordance with the related art.
Figure 4:
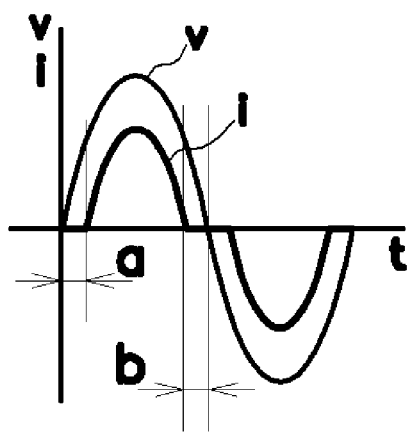
FIG. 4 is a waveform diagram of input voltage and driving current at the unidirectional LED module in accordance with the related art.
Figure 14:
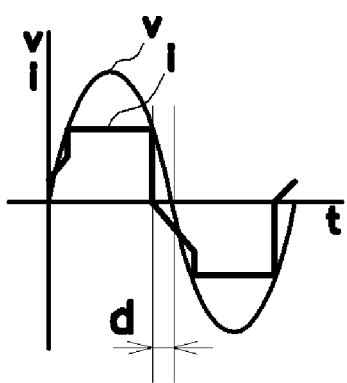
FIG. 14 is a voltage and current waveform diagram of a constant-current-drive bidirectional LED module device in accordance with an eighth embodiment of the present invention.

FIG. 14 is a voltage and current waveform diagram of a constant-current-drive unidirectional LED module device in accordance with an eighth embodiment of the present invention. In accordance with the embodiment of the present invention, the constant-current-drive unidirectional LED module device has the LED operating period having wider than that of the circuit in accordance with the related art of FIG. 3 to increase the active power, thereby improving the power factor (PF) and has the larger root mean square value of the fundamental wave than that of the circuit in accordance with the related art of FIG. 3, thereby improving the total harmonic distortion (THD).

Figure 15:
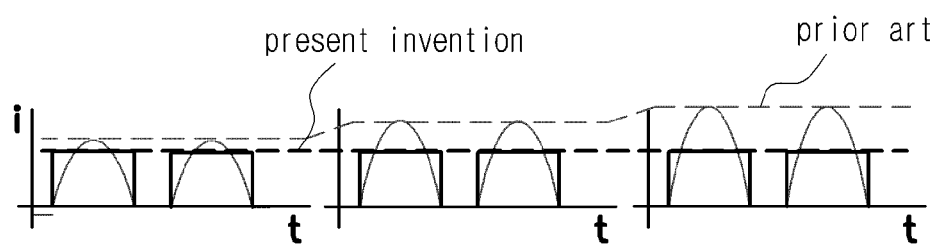
FIG. 15 is a waveform diagram of optical output in accordance with the related art to optical output in accordance with the first to eighth embodiments of the present invention.

FIG. 15 is a waveform of optical output in accordance with the related art to optical output in accordance with the first to eighth embodiments of the present invention.

In accordance with the embodiment of the present invention, even though the input power source voltage is fluctuated, it can be appreciated that the increase in the AC peak current is limited to minimize the change in current and thus, the optical output is not changed.

Figure 1:
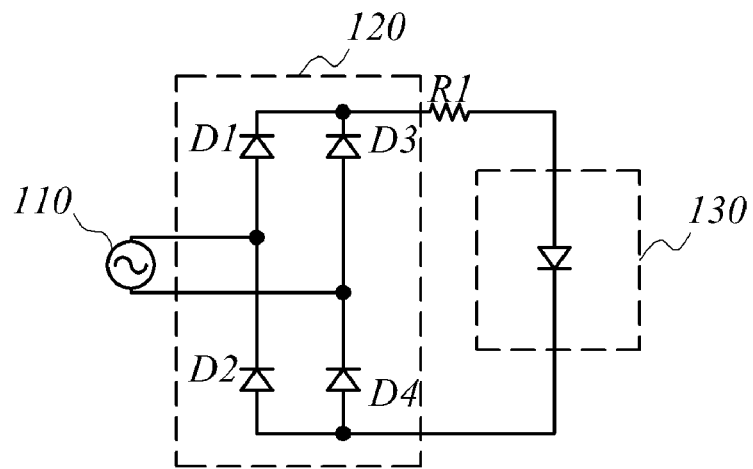
FIG. 1 illustrates a unidirectional LED module device in accordance with the related art.
Figure 2:
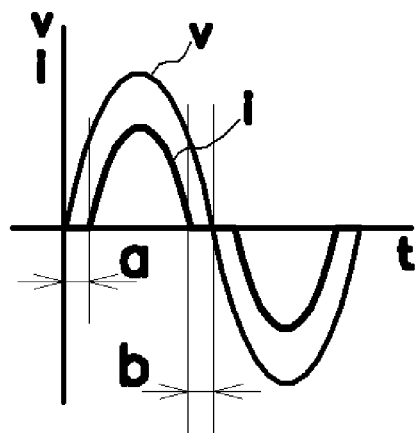
FIG. 2 is a waveform diagram of input voltage and driving current at the unidirectional LED module in accordance with the related art.

On the other hand, in accordance with the related art of FIGS. 1 and 2, it can be appreciated that the current is fluctuated in proportion to the fluctuation of the AC voltage and thus, the output optical is also fluctuated.

Meanwhile, FIG. 15 illustrates a case in which the influence of the charging and discharging unit in accordance with the embodiment of the present invention is disregarded.

Figure 16:
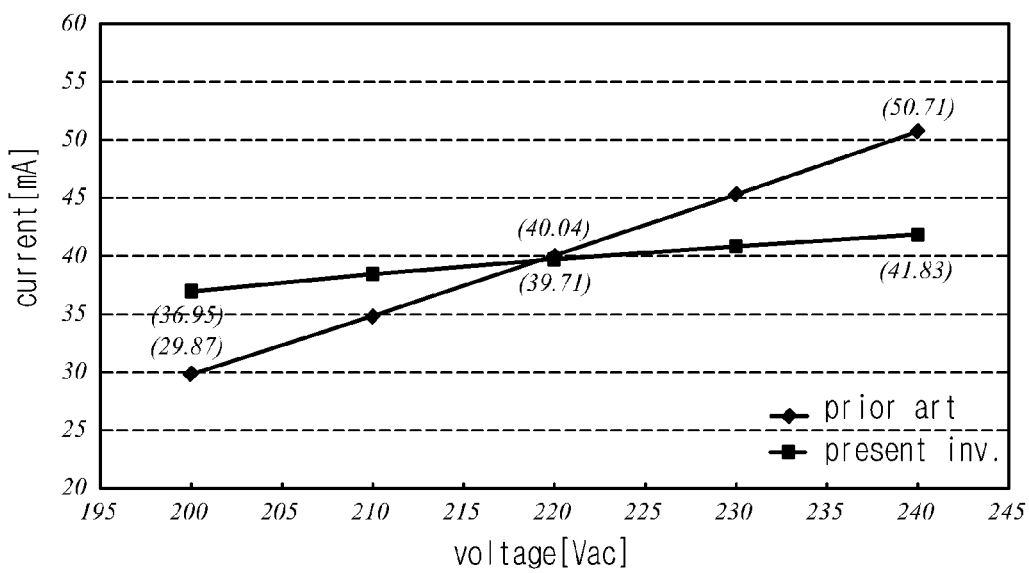
FIG. 16 is a graph illustrating current characteristics to input voltage at the unidirectional LED module devices in accordance with the related art and the present invention.

FIG. 16 is a graph illustrating current characteristics to input voltage at the unidirectional LED module devices in accordance with the related art and the present invention. Even though the input voltage in accordance with the embodiment of the present invention is more fluctuated than the related art, the fluctuation in the load current illustrates very significant constant current characteristics.

That is, in accordance with the related art, when the input voltage is further reduced to 10% than rated voltage, the load current is reduced to (40.04−29.87)/40.04*100=25.4% and the input voltage is further increased to 10% than the rated voltage to increase the load current to (50.71−40.04)/40.04*100=26.6% when the 240 volt is input.

On the other hand, in accordance with the embodiment of the present invention, the load current is reduced to (39.71−36.95)/39.71*100=7% when applying 200 volt and the load current is increased to (41.83−39.71)/39.71=5.3% when applying 240 volts. Herein, the circuit of the related art and the circuit of the embodiment of the present invention will be input to the LED lamp of 8 watt.

Figure 17:
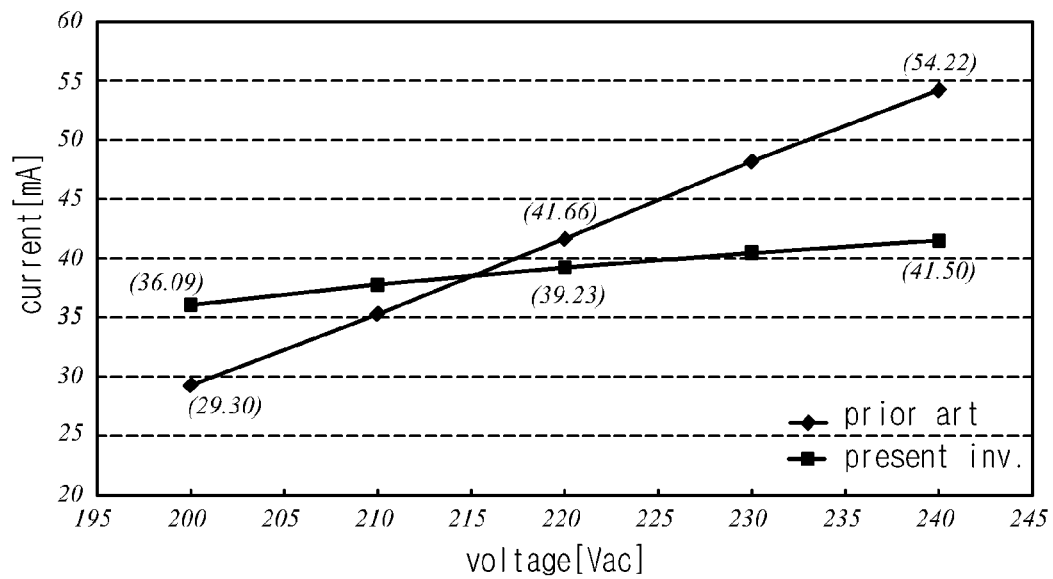
FIG. 17 is a graph illustrating current characteristics to input voltage at the bidirectional LED module devices in accordance with the related art and the present invention.

FIG. 17 is a graph illustrating current characteristics to input voltage at the bidirectional LED module devices in accordance with the related art and the present invention. Even though the input voltage in accordance with the embodiment of the present invention is more fluctuated than the related art, the fluctuation in the load current illustrates very significant constant current characteristics.

That is, in accordance with the related art, when the input voltage is further reduced to 10% than rated voltage and the 240 volt is input, the load current is reduced to (41.66−29.30)/41.66*100=29.7% and the input voltage is further increased to 10% than the rated voltage to increase the load current to (54.22−41.66)/41.66*100=30.1%.

On the other hand, in accordance with the embodiment of the present invention, the load current is reduced to (39.23−36.09)/139.23*100=8% when applying 200 volt and the load current is increased to (41.50−39.23)/139.23=5.8% when applying 240 volts. Herein, the circuit of the related art and the circuit of the embodiment of the present invention will be input to the LED lamp of 8 watt.

Figure 18:
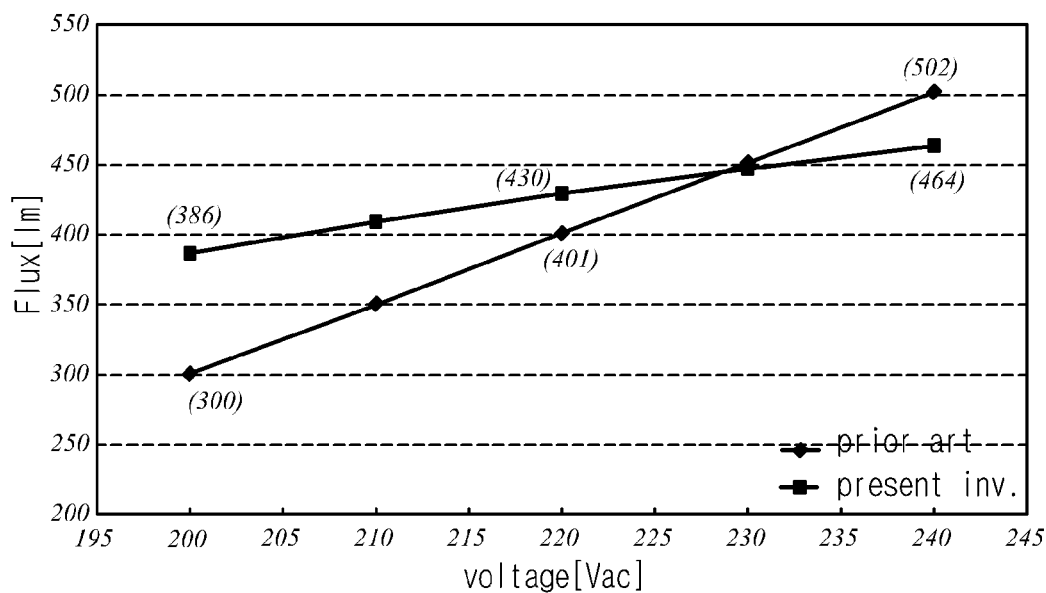
FIG. 18 is a graph illustrating luminous quantity characteristics to input voltage at the unidirectional LED module devices in accordance with the related art and the present invention.

FIG. 18 is a graph illustrating luminous quantity characteristics to input voltage at the unidirectional LED module devices in accordance with the related art and the present invention. As compared with the related art, the embodiment of the present invention does not greatly increase the luminous quantity even though the input voltage is increased.

That is, in accordance with the related art, when the input voltage is further reduced to 10% than the rated voltage and thus, 200 volt is input, the luminous quantity is reduced to (401−300)/4*100=25.2% and the input voltage is further increased to 10% than the rated voltage and thus, 240 volt is input, the luminous quantity is increased to (502−401)/401*100=25.2%.

On the other hand, in accordance with the embodiment of the present invention, the luminous quantity is reduced to (430−386)/1430*100=10.2% when applying 200 volt and the load current is increased to (464−430)/430=7.9% when applying 240 volt. Herein, the circuit of the related art and the circuit of the embodiment of the present invention will be input to the LED lamp of 8 watt.

Figure 19:
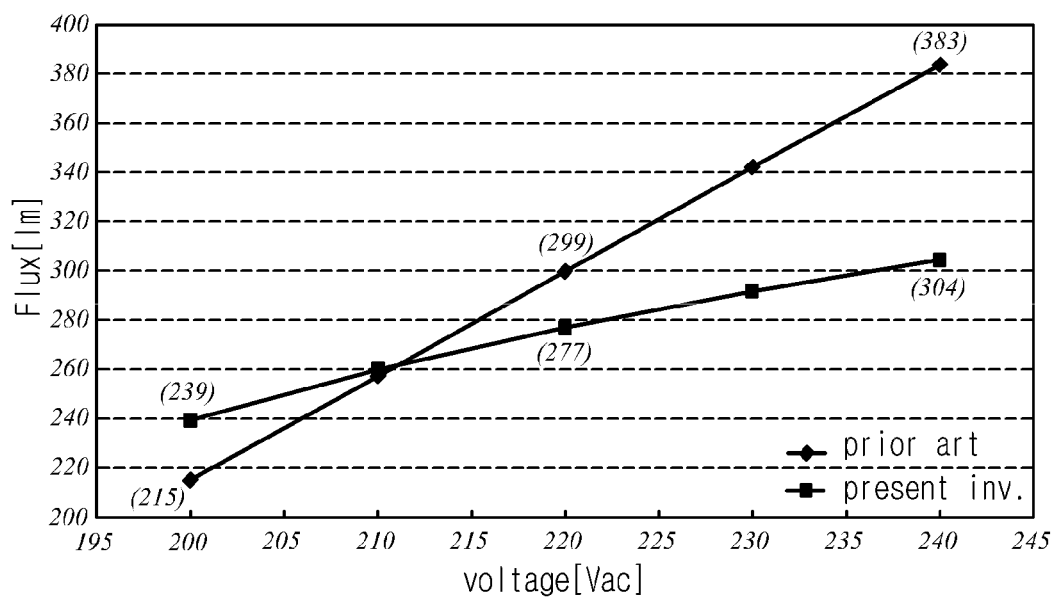
FIG. 19 is a graph illustrating luminous quantity characteristics to input voltage at the bidirectional LED module devices in accordance with the related art and the present invention.

FIG. 19 is a graph illustrating luminous quantity characteristics to input voltage at the bidirectional LED module devices in accordance with the related art and the present invention. As compared with the related art, it can be appreciated that the embodiment of the present invention does not greatly increase the luminous quantity even though the input voltage is increased.

That is, in accordance with the related art, when the input voltage is further reduced to 10% than the rated voltage and thus, 200 volt is input, the luminous quantity is reduced to (299−215)/299*100=28.1% and the input voltage is further increased to 10% than the rated voltage and thus, 240 volt is input, the luminous quantity is increased to (383−299)/299*100=28.1%.

On the other hand, in accordance with the embodiment of the present invention, the luminous quantity is reduced to (277−239)/277*100=13.7% when applying 200 volt and the luminous quantity is increased to (304−277)/277=9.7% when applying 240 volt. Herein, the circuit of the related art and the circuit of the embodiment of the present invention will be applied to the LED lamp of 8 watt.

As described above, while the present invention has been described in connection with the exemplary embodiments, modifications and variations can be made without departing from the scope of the present invention.

The constant-current-drive LED module device in accordance with the present invention can be used for the LED lighting device driven with alternating current.

In accordance with the embodiments of the present invention, the flicker phenomenon occurring due to the AC LED operating characteristics according to the input of the AC power source can be suppressed so as to be appropriately used for the lighting device. The lifespan of the lighting device can be expanded due to the suppression of the flicker phenomenon.

Further, in accordance with the embodiments of the present invention, the light efficiency degradation can be improved and thus, the degradation in a power factor can be improved.

In addition, the embodiments of the present invention can have the LED operating period wider than that of the related art to increase the active power, thereby improving the power factor (PF) and has the larger effective value of the fundamental wave, thereby improving the total harmonic distortion (THD).

Therefore, the spirit of the present invention should not be limited to the above-described exemplary embodiments, but should be defined by the following claims as well as all modified equally or equivalently to the claims.

What is claimed is

1. A constant-current-drive LED module device, comprising:
   a rectifier receiving and rectifying an alternating current power source and including four diodes connected in a bridge configuration, the rectifier having input terminals, a first output terminal and a second output terminal;
   a bidirectional LED module unit of which a first end is connected to one of the input terminals of the rectifier and a second end is connected to an alternating current power source;
   a charging and discharging unit charging and discharging the alternating current power source and including a resistor-capacitor series circuit, the resistor-capacitor series circuit being connected with the bidirectional LED module unit in parallel;
   a switching unit connected between the first output terminal of the rectifier and the second output terminal of the rectifier and switched by a pulsating current output of the rectifier;
   a control voltage output unit detecting load current flowing in the bidirectional LED module unit and outputting a first level driving voltage and a second level driving voltage according to a magnitude of the load current; and
   a constant current driver controlled by the first level driving voltage and the second level driving voltage to provide constant current.

2. A constant-current-drive LED module device comprising:
   a rectifier receiving and rectifying an alternating current power source and including four diodes connected in a bridge configuration, the rectifier having input terminals, a first output terminal and a second output terminal;
   a bidirectional LED module unit of which a first end is connected to one of the input terminals of the rectifier and a second end is connected to an alternating current power source;
   a charging and discharging unit charging and discharging the alternating current power source and including a resistor-capacitor series circuit, the resistor-capacitor series circuit being connected with the bidirectional LED module unit in parallel;
   a control voltage output unit detecting load current flowing in the bidirectional LED module unit and a first level driving voltage and a second level driving voltage according to a magnitude in the load current; and
   a constant current driver controlled by the first driving voltage and the second driving voltage to provide the constant current.

3. The constant-current-drive LED module device of claim 1, wherein the constant current driver is any one of a field effect transistor (FET), a bipolar junction transistor (BJT), and an insulated gate bipolar transistor (IGBT).

4. The constant-current-drive LED module device of claim 1, wherein the control voltage output unit includes:
- a detection resistor detecting load current flowing in the bidirectional LED module unit; and
- a three terminal zener diode outputting the first level driving voltage when control voltage applied to the detection resistor is a predetermined value or less, and outputting the second level driving voltage maintaining a short state between an anode and a cathode when the control voltage exceeds the predetermined value.

5. The constant-current-drive LED module device of claim 1, wherein when an input voltage of the alternating current power source is fluctuated within a range of 10% of the rated voltage, the load current flowing in the unidirectional LED module unit is fluctuated within a range of 5 to 20%.

6. The constant-current-drive LED module device of claim 1, wherein when an input voltage of the alternating current power source is fluctuated within a range of 10%, luminous quantity of the bidirectional LED module unit is fluctuated within a range of 9 to 20%.

\* \* \* \* \*